2,965,511
PHTHALOCYANINE PIGMENT

Frank H. Moser, Huntington, W. Va., assignor to Standard Ultramarine & Color Co., Huntington, W. Va., a corporation of West Virginia No Drawing. Filed June 24, 1955, Ser. No. 517,896

12 Claims. (Cl. 106—288)

This invention relates generally to phthalocyanine and similar pigments of improved resistance to flocculation from organic vehicles. More particularly, the invention relates to phthalocyanine and related pigment compositions containing an aluminum tertiary butyl benzoate and to methods for preparing such pigment compositions. The invention further relates to the aluminum tertiary butyl benzoates per se as novel and useful compositions of matter.

Phthalocyanine pigments are conventionally produced as hard crystalline bodies which are converted into commercially acceptable pigment compositions by conventional processes, such as acid pasting or ball mill grinding. Phthalocyanine pigment compositions produced by such methods quickly flocculate and settle out when dispersed in organic vehicles such as those used in the formulation of paints, lacquers, and enamels.

Flocculation is a grouping or orientation of the phthalocyanine pigment particles or aggregates of such particles and may be observed as a change in shade in the coating composition in which the pigment is dispersed. Flocculation necessitates remixing of coating compositions in which it occurs and, in some cases, may completely destroy the utility of such compositions. The flocculation varies to some extent with the coating composition formulation. However, special formulations have not proved universally effective and are not commercially attractive because of the particular mixing problems attendant thereto.

Vesce et al. Patent 2,327,472 suggests that the tendency of phthalocyanine pigments to flocculate in organic vehicles may be retarded by incorporating in the pigments aluminum tribenzoate. The expedient of Vesce et al., while affording a partial solution to the problem of flocculation of phthalocyanine pigments from coating composition vehicles, has some commercially undesirable features. Of major significance is the fact that the Vesce et al. procedure yields a phthalocyanine pigment product in which the strength of the pigment is seriously diluted. Furthermore, for best results the Vesce et al. pigment composition must be produced by precipitating aluminum tribenzoate in situ in the phthalocyanine pigment. Such a procedure, in consequence of the properties of the reagents from which aluminum tribenzoate is produced, and of aluminum tribenzoate per se, requires excessive amounts of such reagents and is, therefore, economically undesirable.

It is accordingly a primary object of the invention to provide phthalocyanine pigment compositions which are resistant to flocculation from organic vehicles and which are substantially stronger color bodies than analogous compositions known to the prior art, including the compositions of Vesce et al. Patent 2,327,472.

It is a further primary object of the invention to provide strong, flocculation-resistant, phthalocyanine pigment compositions which can be produced in high yield.

It is a specific object of the invention to provide strong, flocculation-resistant, phthalocyanine pigment compositions comprising aluminum tertiary butyl benzoates.

It is a specific object of the invention to provide a strong, flocculation-resistant, phthalocyanine pigment composition containing aluminum tri-para-tertiary butyl benzoate.

It is a further specific object of the invention to provide as novel and useful compositions of matter the various aluminum tertiary butyl benzoates, including particularly aluminum tri-para-tertiary butyl benzoate.

It is a further object of the invention to provide a readily dispersible phthalocyanine pigment which is more easily ground to suitable particle size for use in coating compositions and similar pigments of the prior art.

In accordance with this invention, there are provided novel phthalocyanine pigment compositions which embrace a phthalocyanine pigment intimately admixed with an amount of an aluminum tertiary butyl benzoate effective to impart to said composition resistance to flocculation from organic vehicles.

All of the various phthalocyanine pigments are contemplated by the invention, the particular species of which does not constitute the essence of the invention. Such pigments are well known to the art. Reference is made to U.S. Patents Nos. 2,197,458, 2,212,924, 2,276,860 and 2,469,663 which disclose various of the known types of phthalocyanine pigments. Such pigments are further described in various texts including, inter alia, Gilman "Organic Chemistry," vol. IV (1953). The invention is applicable, inter alia, to all phthalocyanine blues, including the various metal-free phthalocyanine blues and the metal-containing phthalocyanine blues, such as those containing copper, iron, nickel, aluminum, chromium, cobalt, zirconium, titanium, and the like.

Likewise, the various phthalocyanine greens and blue-greens resulting from varying degrees of halogenation to incorporate from 1 to 16 halogen atoms in the aromatic nuclei of the phthalocyanine molecule are contemplated by the invention. Such greens are described in detail, for example, in U.S. Patents Nos. 2,214,469, 2,247,752, 2,253,560, 2,377,685 and 2,549,842. Both the metal-containing and the metal-free phthalocyanine greens are contemplated, including specifically copper phthalocyanine greens and other metal phthalocyanine greens, including those in which the metal present is iron, cobalt, aluminum, chromium, titanium, zirconium, and the like.

The invention contemplates utilization, in conjunction with the phthalocyanine pigments, all of the various aluminum tertiary butyl benzoates. Such aluminum tertiary butyl benzoates respond to the following formula:

I

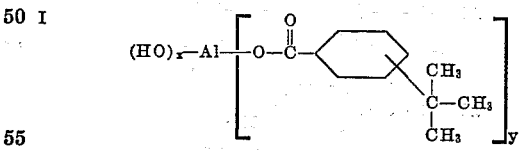

in which y is an integer from 1 to 3 and x is equal to 3—y. As indicated in the foregoing formula, the tertiary butyl group may be ortho-, meta-, or para-substituted with respect to the carboxyl group in the benzene ring. Specifically, the following compounds are contemplated by the invention.

II(a)

(b)

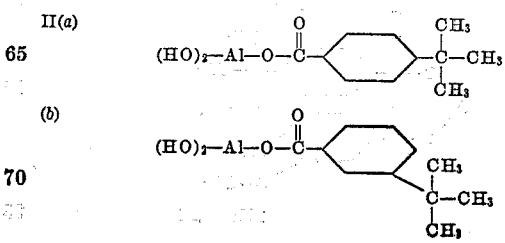

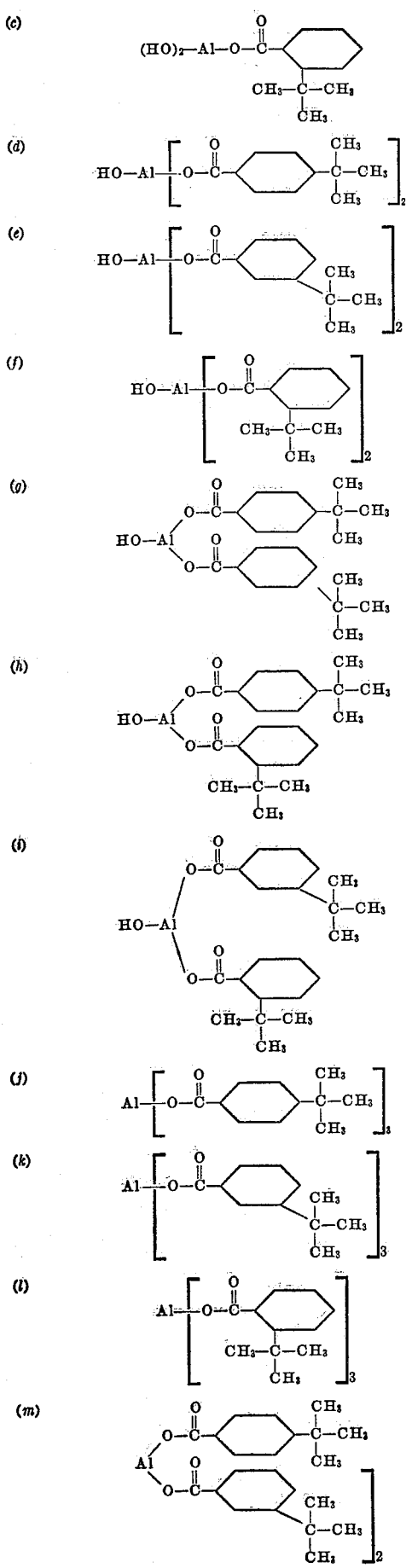
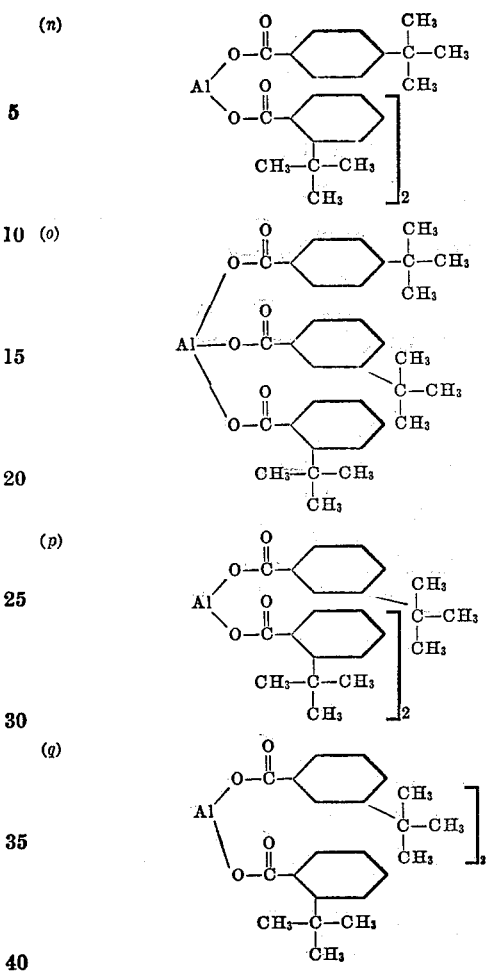

The preferred aluminum tertiary butyl benzoate is aluminum para-tertiary butyl benzoate, the most preferred compound being aluminum tri-para-tertiary butyl benzoate.

The aluminum tertiary butyl benzoates which are embraced by this invention are employed in proportions requisite to impart resistance to flocculation from organic solvent vehicles to the phthalocyanine pigments with which the benzoates are employed. The particular proportions of aluminum tertiary butyl benzoate in phthalocyanine pigments do not constitute the essence of the invention.

In the preferred embodiment of the invention, there is employed from about 25% to about 75% by weight of phthalocyanine pigment and from about 75% to about 25% by weight of aluminum tertiary butyl benzoate. More preferred ranges of proportions are from about 40% to about 60% by weight of phthalocyanine pigment compounded with about 60% to about 40% by weight of aluminum tertiary butyl benzoate.

It is preferred to prepare the pigment compositions of the invention by the precipitation or formation of the aluminum tertiary butyl benzoate in situ on the phthalocyanine pigment. Physical dry mixtures of the phthalocyanine pigments in the aluminum tertiary butyl benzoates are also contemplated and are employed within the purview of the invention.

In the preferred practice of the method of the invention, a conventional copper phthalocyanine press cake, such as may be produced, for example, by the method of Patent No. 2,469,663, is slurried with an appropriate amount of water to produce a flowable composition containing on the order of 5% to 10% by weight of solids. The pH of the slurry is adjusted to a range of about 5 to 9. There is then added to the slurry a solution containing about 5% to about 10% by weight of a soluble salt, such as an alkali metal salt, of the desired tertiary butyl benzoic acid. To the mixture so produced there is then added a solution containing about 5% to about 10% by weight of a soluble aluminum salt, such as aluminum sulfate, whereupon the aluminum tertiary butyl benzoate is precipitated in situ. Inasmuch as substantially 100% yields of aluminum tertiary butyl benzoates are obtained in accordance with this invention, the water-soluble aluminum salt is employed in substantially stoichiometric amounts, based on the amount of tertiary butyl benzoate utilized. The slurry so produced is stirred, filtered, and dried to produce the pigments to which the invention is directed.

When it is desired to produce mono- or di-tertiary butyl aluminum benzoates, there is reacted with an aqueous solution of an aluminum salt an amount of an aqueout solution of an alkali metal salt of a tertiary butyl benzoic acid requisite stoichiometrically to produce the desired product. For example, by reaction of one equivalent of an alkali metal tertiary butyl benzoate with three equivalents of an aluminum salt, there may be produced aluminum mono-tertiary butyl benzoate. Likewise, by the reaction of two equivalents of benzoates with three equivalents of the aluminum salt, there may be produced aluminum di-tertiary butyl benzoate.

The aluminum tertiary butyl benzoates with which this invention is concerned as novel compositions of matter are appropriately produced by conventional metathetical reactions, such as that above described with reference to the production of the phthalocyanine pigment composition. More specifically, soluble salts of the desired tertiary butyl benzoic acid can be dissolved in water to provide about a 5% to 25% by weight solution thereof which is thereafter reacted with an aqueous solution containing about 5% to about 25% by weight of a water-soluble aluminum salt. Solutions of greater or lesser concentration can be employed. The particular water-soluble aluminum salt is not critical, and all such salts are contemplated. Representative salts other than aluminum sulfate which can be employed include aluminum nitrate, aluminum acetate, and aluminum chloride.

Likewise, the particular water-soluble salt of tertiary benzoic acid employed does not constitute the essence of this feature of the invention. Alkali metal salts, particularly sodium, potassium, and lithium salts of the various tertiary butyl benzoic acids above listed are preferred. Other soluble salts can be employed.

The method described is the best mode presently known for the production of the novel aluminum tertiary butyl benzoates of the invention. The invention, of course, extends to aluminum tertiary butyl benzoates prepared by any method.

Examples IA through IC and IIA through IIC constitute comparative tests between the phthalocyanine pigment product of this invention and that of the Vesce et al. Patent 2,327,472, which tests demonstrate the superior strength of the pigments of this invention. Examples IA through IC are comparative tests based on Example I of the Vesce et al. Patent 2,327,472, whereas Examples IIA through IIC comprise comparative tests based on Example II of the Vesce et al. Patent 2,327,472.

*Example IA*

50 grams on a dry basis of a copper phthalocyanine blue press cake are slurried with 950 mls. of water. The pH of the resulting slurry is approximately 7. To the resulting slurry, there is added with agitation a 5% by weight solution of sodium para-tertiary butyl benzoate prepared by dissolving 11.2 grams of sodium hydroxide in 1040 mls. of water and thereafter adding to the solution so formed 49.7 grams of para-tertiary butyl benzoic acid. A solution of 31 grams of aluminum sulfate octadecahydrate $Al_2(SO_4)_3 18H_2O$ in 600 mls. of water is then added, and the resulting slurry is stirred for one-half hour. Approximately 50 to 51 grams of aluminum tri-para-tertiary butyl benzoate are precipitated in situ in the reaction mixture. The reaction mixture so produced is filtered, washed with 3 liters of water, and dried at 60° C. A yield of 101 grams of pigment composition is thereby produced. This yield is 100% of theory based on the amount of para-tertiary butyl benzoic acid employed.

The phthalocyanine pigment so produced is tested for flocculation resistance in the following manner: 5 grams of the pigment composition are ground on a roller mill with 22.5 grams titanium dioxide white, 22.5 grams of antimony oxide white, and 50 grams of castor oil No. 4, The mixture is run over the roller mill approximately six times to produce a paste. The paste so produced is formulated into a lacquer by combination of 20 grams of such paste with 100 grams of thinned, clear, lacquer solution. The coating composition so formed is mixed, poured over a glass slide, and allowed to dry to form a film. A drop of lacquer solvent is then applied to the film and allowed to evaporate. The ring where the evaporation of the drop of solvent occurred is substantially the same color as the rest of the glass color slide, thus demonstrating that the pigment composition was well dispersed and resistant to flocculation.

A similar pigment which is not flocculation resistant would have turned off color and left a whitish ring surrounding the area where the solvent drop evaporated.

The thinned, clear, lacquer solution above referred to was prepared by mixing 1400 grams of a ½ second nitrocellulose solution containing 30% solids and mixing with 96 grams of Aroplaz 906–X resin solution (a non-oxidizing coconut oil alkyd resin, 50% solids in xylol), and 2220 grams of lacquer solvents consisting of 40% ethyl acetate by volume, 40% butyl acetate by volume, and 20% butanol by volume.

*Example IB*

50 grams on a dry basis of the same phthalocyanine blue press cake employed in Example IA are slurried with 950 mls. of water. The resulting slurry has a substantially neutral pH. To this slurry there is added 74 parts by weight of sodium benzoate as a 5% aqueous solution. To the resulting mixture there is added with good stirring 60 grams of aluminum sulfate as a 5% solution. The resulting slurry is stirred for about 30 minutes, filtered, washed with 3 liters of water, and dried at 60° C. The yield is 102 grams of a pigment composition, or a yield of about 87.3% of theory based on the sodium benzoate employed.

*Example IC*

5 grams of the phthalocyanine blue pigment composition obtained in each of Examples IA and IB are ground with 45 grams of titanium dioxide and 50 grams of vehicle described in Example IA with respect to the flocculation test of the product of that example. 1 gram of the resulting paste or ink produced from the product of Example IB is mixed with 5 grams of a white bleach consisting of 70% titanium dioxide and 30% by weight of vehicle of the same type as that above referred to. It is determined that only 0.65 grams of the paste or ink produced from the paste or ink of Example IA is required to produce a bleached composition equal to the product of Example IB in shade and strength or color intensity. The composition of the invention as represented by Example IA is therefore 35% strong as compared with the composition of Example IB.

*Example IIA*

100 grams on a dry basis of the same phthalocyanine blue press cake as described in Example IA are slurried with sufficient water to make a paste containing 10% water. To this paste is added a solution of 110.3 grams of para-tertiary butyl benzoic acid and 24.9 grams of sodium hydroxide in 1000 mls. of water. The resulting slurry is well agitated and a solution of 16.8 grams of aluminum sulfate octadecahydrate in 1000 mls. of water is added. Aluminum tri-para-tertiary butyl benzoate is precipitated in situ and the slurry was stirred for one-half hour, filtered, washed with 4 liters of water, and dried at 60° C. A yield of 218.5 grams of pigment composition is obtained. The yield is 100% of theory based on the amount of paratertiary butyl benzoic acid employed. The pigment so produced is found to be flocculation resistant when tested by the procedure described in Example IA.

*Example IIB*

100 grams on a dry basis of copper phthalocyanine blue press cake, of the same type employed in Example IIA, is slurried with water to form a 10% paste. The paste so produced is stirred simultaneously with the addition of a solution of 148 grams of sodium benzoate in 1480 mls. of water. There is then added with agitation a solution of 120 grams of aluminum sulfate in 1000 mls. of water. The aluminum tribenzoate is precipitated in situ and the mixture is stirred for 30 minutes, filtered and washed with 4 liters of water. The filter cake is dried at 60° C. A yield of 215.5 grams of pigment composition is obtained. The yield is 92.2% of theory based on the amount of sodium benzoate employed.

*Example IIC*

The relative strengths of the pigment compositions of Examples IIA and IIB are compared. 5 grams of the phthalocyanine blue composition of each of Experiments IIA and IIB are ground with 45 grams of titanium dioxide, and 50 grams of vehicle of the type described in Example IA. 1 gram of the resulting ink produced from the composition of Example IIB is mixed with 5 grams of titanium dioxide bleach consisting of 70% titanium dioxide and 30% of vehicle, as above described. It was determined that only 0.72 grams of the ink produced from the product of Example IIA is required to produce a composition equal in color intensity, i.e., shade and strength, to that produced by 1 gram of the ink of the product of Example IIB. The composition of Example IIA is, therefore, about 28% strong with respect to Example IIB.

*Example III*

20 parts on a dry basis of a moist copper phthalocyanine press cake are slurried in 180 parts of water. To this slurry, while stirring, there is added a solution of 19.13 parts by weight of para-tertiary butyl benzoic acid, 4.8 parts by weight of sodium hydroxide and 215 parts by weight of water. The resulting slurry is stirred for 10 minutes and then, over a period of about 10 minutes, 12.5 parts by weight of aluminum sulfate octadecanoichydrate are added in the form of a 10% aqueous solution with the result that aluminum tri-para-tertiary butyl benzoate is precipitated in the system. The resulting slurry is agitated for two hours, filtered, and washed with 1000 parts by weight of water. The press cake is dried at 65° C. There is obtained 40 parts of a lake consisting of one-half phthalocyanine blue and one-half aluminum tri-para-tertiary butyl benzoate. The yield was 100% based upon the para-tertiary butyl benzoic acid employed. The pigment composition produced by this example is found to be resistant to flocculation when tested by the procedure described in Example IA.

*Example IV*

16 parts by weight on a dry basis of a moist phthalocyanine blue press cake are slurried with 180 parts of water. To this slurry while stirring there is added a solution of 23 parts by weight of para-tertiary butyl benzoic acid, 5.2 parts by weight of sodium hydroxide, and 300 parts by weight of water. The resulting slurry is stirred for 10 minutes, and over a period of 10 minutes there is added a solution of 16.4 parts of aluminum sulfate octadecanoichydrate in 175 parts by weight of water. Aluminum para-tertiary butyl benzoate is precipitated in situ. The resulting slurry is stirred for 2 hours, filtered, and washed free of solubles. The filter cake is dried at 65° C. There is obtained a yield of 40 parts of the lake consisting of 16 parts of phthalocyanine blue and 24 parts of aluminum para-tertiary butyl benzoate. The yield is 100% based upon the amount of alumimum para-tertiary butyl benzoate employed. The pigment composition produced by this example is found to be resistant to flocculation when tested by the procedure described in Example IA.

*Example V*

20 parts by weight of a phthalocyanine green press cake are slurried in 180 parts by weight of water. The phthalocyanine green press cake is produced by the method described in U.S. Patent No. 2,549,842 and is the copper salt of a halogenated phthalocyanine containing about 16 chlorine atoms in the benzene nuclei of the phthalocyanine molecule. A solution of 19.13 parts by weight of para-tertiary butyl benzoate, 4.5 parts by weight of sodium hydroxide, and 215 parts by weight of water are added to the press cake slurry with agitation. The resulting mixture is stirred for 10 minutes, and over a further period of 10 minutes a 10% solution of 12.5 parts by weight of aluminum sulfate octadecanoichydrate is added to effect precipitation in the system of aluminum para-tertiary butyl benzoate. The resulting slurry is agitated for two hours, filtered, and washed with 1000 parts by weight of water. The filter cake is dried at 65° C. The yield is 40 parts of a phthalocyanine green aluminum tri-para-tertiary butyl benzoate lake. The yield is 100% of theory based on the amount of para-tertiary butyl benzoic acid employed. The pigment composition produced by this example is found to be resistant to flocculation when tested by the procedure described in Example IA.

*Example VI*

This example illustrates the preparation of a dry mixed lake in accordance with the invention. As a first step in the preparation of such lake, there is prepared the salt aluminum tri-para-tertiary butyl benzoate. The salt so produced is then mixed on a dry basis with dry phthalocyanine blue pigment to produce a composition of the invention.

The aluminum tri-para-tertiary butyl benzoate is prepared by dissolving 19.13 parts of para-tertiary butyl benzoic acid in a solution of 4.8 parts by weight of sodium hydroxide in 250 parts by weight of water. To this solution there is added with agitation 12.5 parts by weight of aluminum sulfate octadecanoichydrate in 125 parts of water. An immediate precipitate forms converting the reaction mixture to a slurry which is stirred for one-half hour, filtered, and washed with 1000 parts of water. The resulting filter cake is dried at 65° C. The yield is 20 parts by weight of para-tertiary butyl benzoate, 100% of theory based on the paratertiary butyl benzoic acid employed.

This material corresponds to the following formula:

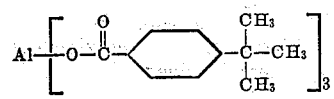

and contains 4.83% by weight aluminum, 70.95% by weight carbon, 7.04% by weight hydrogen, and 17.18% by weight oxygen. The aluminum tri-para-tertiary butyl benzoate produced is characterized by a melting point in excess of 400° C. The aluminum tri-para-tertiary butyl benzoate is characterized by the following solubilities:

0.011 g. per 100 ml. in water at 25° C.
0.445 g. per 100 ml. in xylene at 50° C.
0.445 g. per 100 ml. in acetone at 50° C.
0.430 g. per 100 ml. in butyl alcohol at 50° C.
0.430 g. per 100 ml. in butyl acetate at 50° C.

20 parts by weight of the aluminum tri-para-tertiary butyl benzoate, which was recovered in the form of white amorphous particles, were mixed with 20 parts by weight of a finished phthalocyanine toner consisting of chloro copper phthalocyanine blue. The resulting mixture was ground together by passing the same two times through a hammermill to produce the pigment composition with which the invention is concerned.

The pigment composition produced by this example is found to be resistant to flocculation when tested by the procedure described in Example IA.

*Example VII*

Example VI is repeated with the exception that in this instance there is employed in the production of an aluminum para-tertiary butyl benzoate only about 17.9 parts by weight of para-tertiary butyl benzoic acid with the result that the aluminum salt produced is aluminum di-para-tertiary butyl benzoic acid. This compound gave a final pigment composition similar to that described in Example VI. Similar repetition of Example VI through utilization of 15.0 parts by weight of para-tertiary butyl benzoic acid to produce aluminum mono-para-tertiary butyl benzoate gave rise to analogous results.

The pigment composition produced by this example is found to be resistant to flocculation when tested by the procedure described in Example IA.

The art is well versed in the metathetical reactions by which the aluminum benzoates with which this invention is concerned as novel and useful compositions of matter may be produced. The ortho and meta isomers of tertiary butyl benzoic acid are converted into aluminum salts in the same manner and under the same conditions as described in Examples VI and VII.

*Example VIII*

9 parts on a dry basis of copper hexadecylchlorophthalocyanine press cake and 1 part by weight on a dry basis of phthalocyanine monosulfonic acid press cake are slurried in 1000 parts by weight of water. The slurry so produced is stirred for one-half hour. A solution of 2.2 parts by weight of sodium hydroxide, 9.5 parts by weight of para-tertiary butyl benzoic acid, and 200 parts by weight of water are added to the slurry with agitation over a period of one-half hour. A solution of 7 parts by weight of aluminum sulfate octadecanoichydrate and 200 parts of water are slowly added to the slurry and the resulting mixture is stirred for one-half hour. Aluminum tri-para-tertiary butyl benzoate is precipitated. The slurry was filtered, washed with 2000 parts of water, and the filter cake is dried at 55° to 60° C. There is obtained a yield of 20 parts by weight of a lake consisting of 10 parts of aluminum tri-para-tertiary butyl benzoate, 9 parts by weight of copper phthalocyanine, and 1 part by weight of copper phthalocyanine monosulfonic acid or the aluminum salt thereof. The yield was 100% of theory based on the para-tertiary butyl benzoic acid employed.

The pigment composition produced by this example is found to be resistant to flocculation when tested by the procedure described in Example IA.

I claim:

1. A phthalocyanine pigment composition consisting essentially of a phthalocyanine pigment intimately admixed with an amount of an aluminum tertiary butyl benzoate effective to impart to said composition resistance to flocculation from organic paint, varnish, and lacquer vehicles.

2. A phthalocyanine pigment composition consisting essentially of a phthalocyanine pigment intimately admixed with an amount of an aluminum para-tertiary butyl benzoate effective to impart to said composition resistance to flocculation from organic paint, varnish, and lacquer vehicles.

3. A phthalocyanine pigment composition consisting essentially of from about 25 to about 75 parts by weight of a phthalocyanine pigment intimately admixed with about 25 to about 75 parts by weight of an aluminum para-tertiary butyl benzoate, said aluminum para-tertiary butyl benzoate being effective to impart to said composition resistance to flocculation from organic paint, varnish, and lacquer vehicles.

4. A phthalocyanine pigment composition consisting essentially of a phthalocyanine pigment intimately admixed with an amount of aluminum tri-para-tertiary butyl benzoate effective to impart to said composition resistance to flocculation from organic vehicles.

5. The phthalocyanine pigment composition of claim 4 wherein the phthalocyanine pigment is phthalocyanine blue.

6. The phthalocyanine pigment composition of claim 4 wherein the phthalocyanine pigment is a phthalocyanine green.

7. The phthalocyanine pigment composition of claim 4 wherein the phthalocyanine pigment comprises a metal-free phthalocyanine.

8. A phthalocyanine pigment composition consisting essentially of a phthalocyanine blue pigment intimately admixed with aluminum tri-para-tertiary butyl benzoate, there being present in said composition from about 25 to about 75 parts by weight of said pigment and from about 25 to about 75 parts by weight of said benzoate.

9. A phthalocyanine pigment composition consisting essentially of a phthalocyanine blue pigment intimately admixed with aluminum para tertiary butyl benzoate in the proportion about 25 parts to about 50 parts of said benzoate and from about 50 parts to 75 parts by weight of said pigment.

10. A phthalocyanine pigment consisting essentially of a phthalocyanine blue pigment intimately admixed with aluminum tri para tertiary butyl benzoate, there being present in said composition from about 20 to about 75 parts by weight of said pigment and from about 20 to about 75 parts by weight of said benzoate.

11. A phthalocyanine composition consisting essentially of a phthalocyanine blue pigment intimately admixed with aluminum paratertiary butyl benzoate in the proportion of at least about 25 parts of said benzoate to not more than 75 parts by weight of said pigment per 100 parts of total pigment composition.

12. A phthalocyanine pigment composition comprising a phthalocyanine pigment intimately admixed with an anti-flocculating agent consisting essentially of an aluminum tertiary-butyl benzoate in an amount effective to impart to said composition resistance to flocculation of said phthalocyanine pigment from organic paint, varnish, and lacquer vehicles.

References Cited in the file of this patent

UNITED STATES PATENTS

| | | |
|---|---|---|
| 2,141,477 | Knapsack | Dec. 27, 1938 |
| 2,289,286 | Mazabraud | July 7, 1942 |
| 2,292,205 | Denison | Aug. 4, 1942 |
| 2,327,472 | Vesce | Aug. 24, 1943 |
| 2,327,815 | Midercorn | Aug. 24, 1943 |
| 2,439,222 | Scalera et al. | Apr. 6, 1948 |
| 2,476,950 | Beard | July 26, 1949 |
| 2,476,951 | Beard | July 26, 1949 |
| 2,526,345 | Giambalvo | Oct. 17, 1950 |